United States Patent
LaBelle et al.

(10) Patent No.: US 7,053,992 B2
(45) Date of Patent: May 30, 2006

(54) RANGEFINDER AND METHOD FOR COLLECTING CALIBRATION DATA

(75) Inventors: John LaBelle, Long Beach, CA (US);
Steven Szczuka, Cheo Hills, CA (US);
Kenneth W. Baun, Trabuco Canyon, CA (US)

(73) Assignee: Meade Instruments Corporation, Irvine, CA (US)

( * ) Notice: Subject to any disclaimer, the term of this patent is extended or adjusted under 35 U.S.C. 154(b) by 253 days.

(21) Appl. No.: 10/793,144

(22) Filed: Mar. 4, 2004

(65) Prior Publication Data

US 2005/0110977 A1   May 26, 2005

Related U.S. Application Data

(60) Provisional application No. 60/525,621, filed on Nov. 26, 2003.

(51) Int. Cl.
*G01C 25/00* (2006.01)
*G01C 3/08* (2006.01)

(52) U.S. Cl. .......................................... 356/6; 356/5.01
(58) Field of Classification Search ............... 356/5.01, 356/6
See application file for complete search history.

(56) References Cited

U.S. PATENT DOCUMENTS

| | | |
|---|---|---|
| 3,325,750 A | 6/1967 | O'Hern et al. |
| 3,652,161 A | 3/1972 | Ross |
| 3,832,056 A | 8/1974 | Shipp et al. |
| 4,105,332 A | 8/1978 | Hohne et al. |
| 4,131,791 A | 12/1978 | Lego, Jr. |
| 4,226,529 A | 10/1980 | French |
| 4,259,592 A | 3/1981 | Frungel et al. |
| 4,356,457 A | 10/1982 | Di Carlo |
| 4,453,825 A | 6/1984 | Buck et al. |
| 4,527,894 A | 7/1985 | Goede et al. |
| 4,564,818 A | 1/1986 | Jones |
| 4,606,629 A | 8/1986 | Hines et al. |
| 4,609,880 A | 9/1986 | Dermitzakis et al. |
| 4,620,788 A | 11/1986 | Giger |
| 4,770,526 A | 9/1988 | Manhart et al. |
| 4,801,893 A | 1/1989 | Perandi |
| 4,914,402 A | 4/1990 | Dermitzakis et al. |
| 4,959,535 A | 9/1990 | Garrett |
| 5,010,588 A | 4/1991 | Gimlett |
| 5,046,839 A | 9/1991 | Krangle |
| 5,087,808 A | 2/1992 | Reed |
| 5,221,956 A | 6/1993 | Patterson et al. |
| 5,291,200 A | 3/1994 | Lo |

(Continued)

OTHER PUBLICATIONS

Meade Instruments Corporation, "Laser Rangefinder with Speedgun," Weaver catalog, p. 14, published on or around Feb. 3, 2003.

(Continued)

*Primary Examiner*—F. L. Evans
(74) *Attorney, Agent, or Firm*—Knobbe, Martens, Olson & Bear, LLP

(57) ABSTRACT

An apparatus and method for calibrating range measurements are provided wherein calibration data is collected with each range measurement or group of range measurements. The calibration data comprise a plurality of simulated range measurements. In one embodiment, the simulated range measurements are used to analyze errors that vary with time and environmental conditions. Range measurements are calibrated by correlating a measured flight time of a transmitted and reflected laser beam with the simulated range measurements and a relationship between laser beam flight times and target ranges based on the speed of the laser beam.

26 Claims, 8 Drawing Sheets

U.S. PATENT DOCUMENTS

| | | |
|---|---|---|
| 5,291,262 A | 3/1994 | Dunne |
| 5,359,404 A | 10/1994 | Dunne |
| 5,363,064 A | 11/1994 | Mikamura |
| 5,418,609 A | 5/1995 | Dunne |
| 5,521,555 A | 5/1996 | Tazartes et al. |
| 5,521,696 A | 5/1996 | Dunne |
| 5,528,518 A | 6/1996 | Bradshaw et al. |
| 5,539,513 A | 7/1996 | Dunne |
| 5,574,552 A | 11/1996 | Dunne |
| 5,612,779 A | 3/1997 | Dunne |
| 5,623,335 A | 4/1997 | Bamberger |
| 5,652,651 A | 7/1997 | Dunne |
| 5,696,705 A | 12/1997 | Zykan |
| 5,703,678 A | 12/1997 | Dunne |
| 5,715,045 A | 2/1998 | Dunne |
| 5,780,999 A | 7/1998 | Dunne |
| 5,781,147 A | 7/1998 | Elliott et al. |
| 5,790,244 A | 8/1998 | Dunne |
| 5,806,020 A | 9/1998 | Zykan |
| 5,859,693 A | 1/1999 | Dunne et al. |
| 5,880,821 A | 3/1999 | Dunne |
| 5,889,583 A | 3/1999 | Dunne |
| 5,898,484 A | 4/1999 | Harris |
| 5,926,259 A | 7/1999 | Bamberger et al. |
| 5,926,260 A | 7/1999 | Dunne et al. |
| 5,933,224 A | 8/1999 | Hines et al. |
| 5,938,717 A | 8/1999 | Dunne et al. |
| 5,946,081 A | 8/1999 | Lai et al. |
| 5,949,529 A | 9/1999 | Dunne et al. |
| 5,978,393 A | 11/1999 | Feldman et al. |
| 6,023,322 A | 2/2000 | Bamberger |
| 6,043,868 A | 3/2000 | Dunne |
| 6,057,910 A | 5/2000 | Dunne |
| 6,064,330 A | 5/2000 | Elliott et al. |
| 6,226,077 B1 | 5/2001 | Dunne |
| 6,292,501 B1 | 9/2001 | DuBose |
| D453,301 S | 2/2002 | Vermillion |
| 6,377,186 B1 | 4/2002 | Dunne et al. |
| D458,555 S | 6/2002 | Vermillion |
| 6,444,970 B1 | 9/2002 | Barbato |
| 6,445,444 B1 | 9/2002 | Dunne |
| D470,785 S | 2/2003 | Vermillion |
| 6,650,404 B1 | 11/2003 | Crawford |
| 6,683,558 B1 | 1/2004 | Vermillion |
| 2001/0012104 A1 | 8/2001 | Dunne |
| 2004/0015289 A1 | 1/2004 | Poland et al. |
| 2004/0027275 A1 | 2/2004 | Vermillion |

OTHER PUBLICATIONS

Donald G. Baker, "Fiber Optic Design and Applications," Reston Publishing Co., Inc., pp. 144-186, 1985.

Merrill I. Skolnik, "Introduction to Radar Systems," McGraw-Hill Book Co., pp. 388-398.

User Manual, "Pro Laser II Infrared Lidar System," Kustom Signals, Inc., 1991.

Sales Sheets, "Pro Laser II," Kustom Signals, Inc., Feb. 1994.

Operator's Manual, "Marksman LTI 20-20 Laser Speed Detection System," Laser Technology, Inc. 1994.

RANGEFINDER AND METHOD FOR COLLECTING CALIBRATION DATA

RELATED APPLICATIONS

This application claims a priority benefit under 35 U.S.C. §119(e) from U.S. Provisional Patent Application No. 60/525,621, filed on Nov. 26, 2003. The foregoing application is incorporated by reference herein.

BACKGROUND OF THE INVENTION

1. Field of the Invention

The present invention relates to a rangefinder device for measuring a distance to a target.

2. Description of the Related Art

Rangefinders are used to measure distances to targets. Typically, a rangefinder will emit a beam of energy towards a target and detect a reflected beam from the target. The rangefinder measures the time interval between the emission of the transmitted beam and the reception of the reflected beam. This time interval is referred to herein as the "flight time." The distance from the rangefinder to the target is derived from the speed of the beam and the flight time.

The accuracy of range measurements is affected by the rangefinder's ability to accurately measure a beam's flight time because small variations can create significant errors in the distance calculated. Often, capacitor discharge mechanisms are used to create a more manageable representation of the flight time. Even using such discharging mechanisms, delays in the rangefinder's internal circuitry add additional error to flight time interval measurements.

Some errors caused by the internal circuitry are due to inherent delays that can be initially measured and corrected during, for example, factory calibration and test. However, some delays caused by the internal circuitry are variable and may change over time. Further, some delays may change with variations in environmental conditions such as temperature, humidity and the like.

SUMMARY OF THE INVENTION

Thus, it would be advantageous to develop a technique and system for calibrating range measurements using data collected each time a rangefinder acquires a range measurement or a set of range measurements. It would also be advantageous to develop a technique and system to correct range measurement errors related to dynamic factors, such as errors that vary with time or environmental conditions.

The present invention provides a rangefinder and method for calibrating a target range measurement. A rangefinder according to the invention performs a calibration each time a range measurement is taken. The rangefinder collects an uncalibrated range measurement by measuring the flight time of an energy or light beam as it travels to and from a target. The rangefinder automatically generates calibration data by simulating range measurements. The rangefinder uses the calibration data to correct measurement errors and outputs a calibrated range measurement.

According to the foregoing, an embodiment includes a method for calibrating a rangefinder. The method includes determining a first relationship between flight times and target ranges. The method also includes generating a first simulated range measurement by measuring a first discharge time of a capacitor, such as a timing capacitor. A second simulated range measurement is generated by measuring a second discharge time of the capacitor. The first and second simulated range measurements are used to calculate a second relationship between flight times and target ranges. The second relationship is used to correlate an uncalibrated range measurement to the first relationship and a distance to a target is determined.

In an embodiment, a rangefinder is configured to determine a calibrated range to a target. The rangefinder comprises a transmitter configured to emit a beam towards the target, a receiver configured to detect a reflected beam from the target, and timing circuitry configured to measure a flight time between the emission of the beam from the transmitter and a detection of the reflected beam by the receiver. The rangefinder also includes a calibration section configured to determine calibration data related to dynamic factors, such as errors that vary with time or environmental conditions. The rangefinder further includes a processor configured to adjust the flight time based on the calibration data.

In an embodiment, a system is provided for measuring a range to a target. The system includes a means for storing a first parameter proportional to a flight time of a beam and for storing second and third parameters proportional to respective first and second calibration times. The system also includes a means for measuring the stored first, second and third parameters to respectively produce an uncalibrated range measurement and first and second simulated range measurements, and a means for correlating the uncalibrated range measurement to the first and second simulated range measurements.

In an embodiment, a method is provided for measuring a range to a target wherein a first time corresponding to a beam traveling between the range finder and the target is measured and calibration data is collected by simulating a second time and a third time corresponding to the beam traveling between the range finder and the target. The method also includes correlating the first time to the second time and the third time and outputting a range.

Other features and advantages of the present invention will become apparent to those of ordinary skill in the art through consideration of the ensuing description, the accompanying drawings, and the appended claims.

BRIEF DESCRIPTION OF THE DRAWINGS

A system and method which embodies the various features of the invention will now be described with reference to the following drawings.

DETAILED DESCRIPTION OF THE PREFERRED EMBODIMENT

The present invention involves a rangefinder system which performs a calibration each time a range measurement is taken. In an embodiment of the rangefinder system, a raw or uncalibrated range measurement is collected when a user triggers the rangefinder. Alternatively, multiple uncalibrated range measurements are collected when the user triggers the rangefinder. Collecting an uncalibrated range measurement involves measuring the flight time of a beam as it is transmitted to a target and reflected back to the rangefinder system.

Once the uncalibrated range measurement is collected, the rangefinder system of the present invention automatically generates calibration data. Alternatively, the calibration data is generated when the user triggers the rangefinder, before the uncalibrated range measurements are collected. Preferably, the calibration data is generated in relation to the time that the uncalibrated range measurement is collected so as to determine measurement errors related to dynamic factors, such as errors that vary with time or environmental conditions.

According to one aspect of the rangefinder system, calibration data is generated by simulating range measurements. During a simulated range measurement, the rangefinder system measures a known flight time and calculates a measurement error based on the difference between the measured flight time and the known flight time. The rangefinder system calibrates the uncalibrated range measurement by correcting for the calculated measurement error. The rangefinder system then provides the calibrated range measurement to the user.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known components and methods have not been described in detail so as not to unnecessarily obscure aspects of the present invention.

Figure 1:
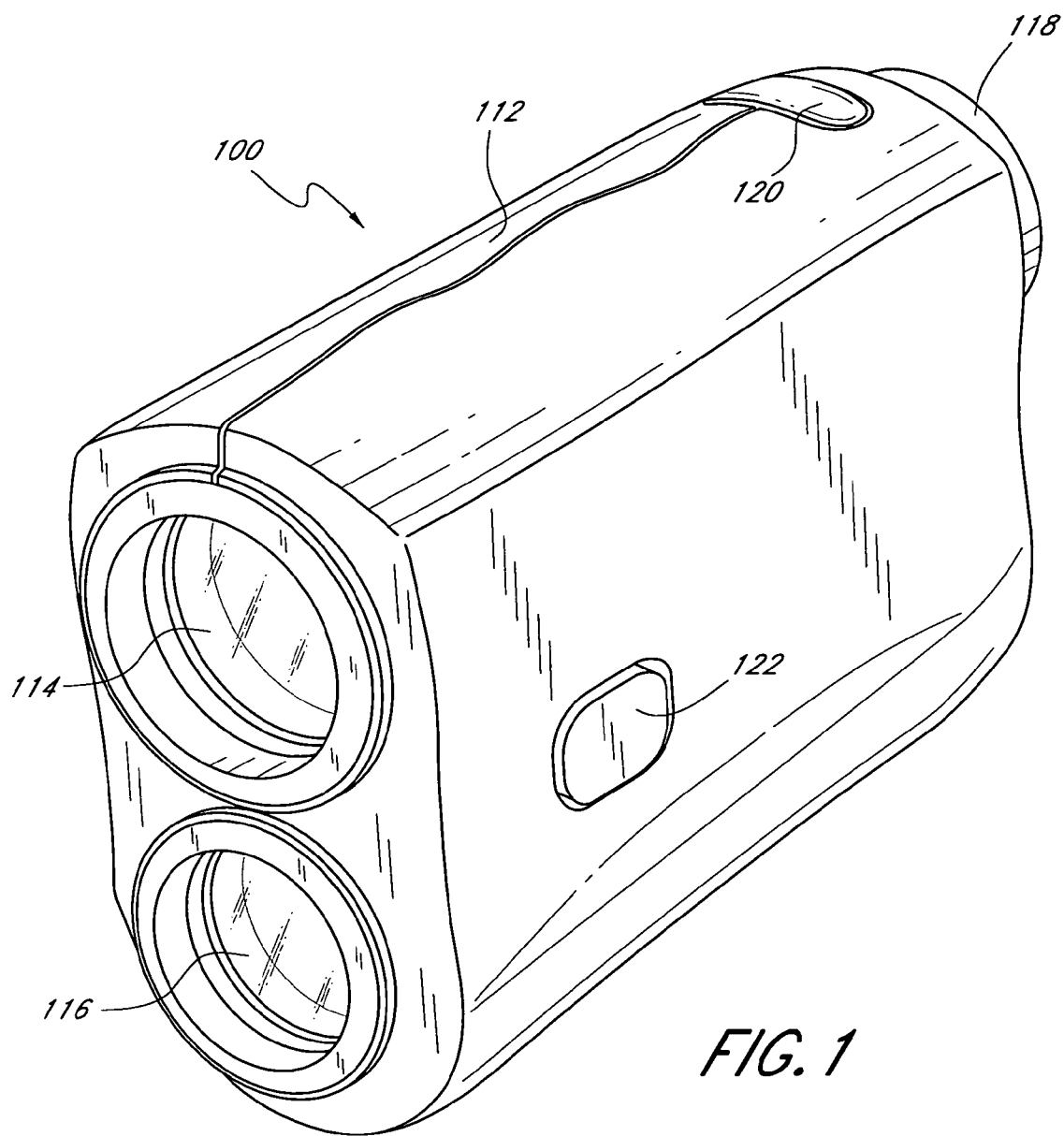
FIG. 1 is a perspective view of an exemplary laser rangefinder according to an embodiment of the invention.

FIG. 1 is a perspective view of an exemplary laser rangefinder 100 according to an embodiment of the invention. The laser rangefinder 100 comprises a housing 112, user optics 114, laser optics 116, a display 118, a power or trigger actuator 120 and a mode selector 122. The laser rangefinder 100 is portable and is configured to be held in a user's hand while taking range measurements. For example, the rangefinder 100 may be used in nature watching, such as bird watching, sports such as golf, hunting, or the like.

Although described with reference to a handheld monocular rangefinder, an artisan will recognize from the disclosure herein that the rangefinder 100 ma be a binocular device, camera, gun, other optical device, or the like. The laser rangefinder 100 may be mounted on a moveable or fixed surface or stand such as a camera tripod or the like.

Figure 2:
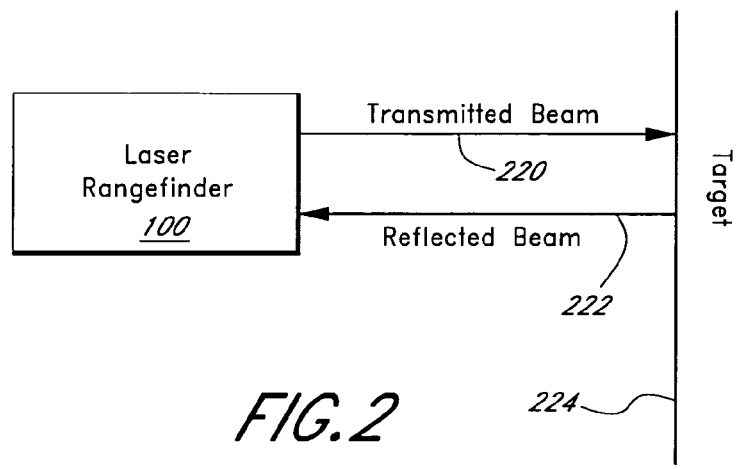
FIG. 2 is an exemplary block diagram illustrating a range determination process usable by the rangefinder of FIG. 1.

FIG. 2 is an exemplary block diagram illustrating a range determination process usable by the rangefinder 100 of FIG. 1. Referring to FIGS. 1 and 2, the display 118 and user optics 114 are used to align the laser optics 116 with a remote target 224. Pressing the trigger actuator 120 causes the laser rangefinder 100 to emit a laser beam 220 toward the remote target 224 through the laser optics 116. In an embodiment, the transmitted laser beam 220 can comprise a pulsed laser beam. The laser rangefinder 100 is configured to detect a reflected laser beam 222 from the target 224 through the laser optics 116. The laser rangefinder 100 is configured to measure the flight time of the transmitted laser beam 220 and the reflected laser beam 222, and to calculate a range from the laser rangefinder 100 to the target 224. In an embodiment, the range is based on the measured flight time (often divided by two) and the speed of the transmitted and reflected laser beams 220, 222. For example, taking the speed of the transmitted and reflected laser beams to be about 0.98357 feet per nanosecond, the range to the target may be calculated in equation (1) as:

$$\begin{aligned} \text{Range} &= 0.98357 \text{ (feet/nanosecond)} \times \\ &\quad \text{(flight time (nanoseconds)}/2) \\ &= 0.49178 \text{ (feet/nanosecond)} \times \\ &\quad \text{flight time (nanoseconds)}, \end{aligned} \quad (1)$$

where 0.98357 feet per nanosecond represents the speed of light in a vacuum and is provided for exemplary reasons only and is not intended to limit or construe the disclosure or claims. In fact, an artisan will recognize from the disclosure herein many possible light or energy beam speeds that can be used.

As discussed in detail hereinbelow, an embodiment of the laser rangefinder 100 is configured to calibrate a raw or uncalibrated range measurement derived from equation (1) to account for errors introduced by internal circuitry delays, aging, and environmental changes.

The display 118 comprises a monocular eyepiece coupled to the user optics 114. Alternatively, the display 118 can comprise binocular eyepieces wherein each eyepiece is coupled to separate user optics (not shown) or to the same user optics 114. As another alternative, the display 118 may comprise a video display such as a liquid crystal display (LCD) screen or the like. Additionally, or alternatively, an artisan will recognize from the disclosure herein a variety of techniques for allowing a user to effectively aim the rangefinder 100 at one or more potential remote targets.

Figure 3:
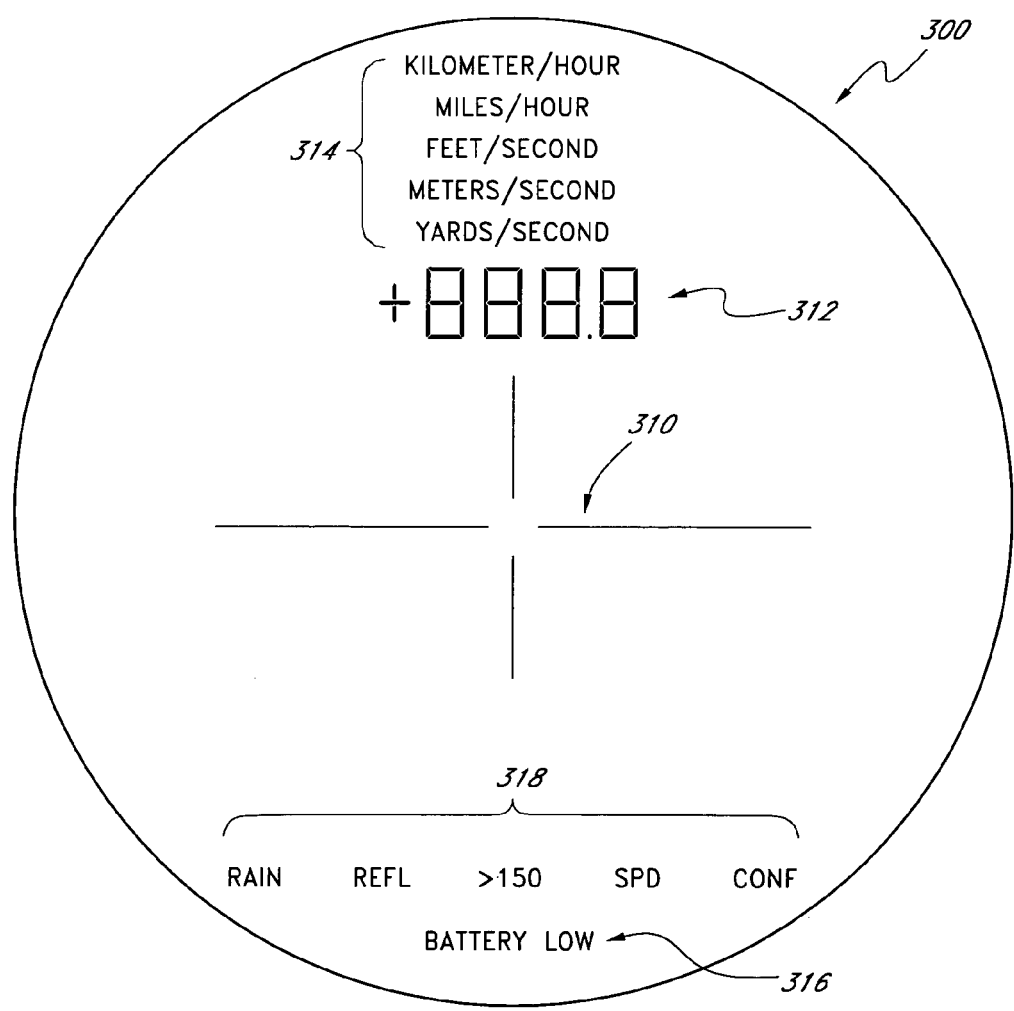
FIG. 3 is an exemplary illustration of a display of the rangefinder of FIG. 1.

FIG. 3 is an exemplary illustration of a user display 300 of the rangefinder 100 of FIG. 1. The user display 300 is visible, for example, when looking at or through the display 118 shown in FIG. 1. The user display 300 can comprise targeting indicia 310 configured to aid a user when aligning the laser optics 116 with a remote target (not shown). Thus, in one embodiment, the user display 300 comprises a transparent background which allows the user to see both the target and the targeting indicia 310.

The user display 300 also comprises range and speed indicia 312 and corresponding active unit indicia 314 configured to display the distance to or speed of a remote target. A user may select the units in which to display a measurement and the corresponding units will be displayed in the active unit indicia 314. For example, speed may be displayed as kilometers/hour, miles/hour, or the like and distance may be displayed as feet/second, meters/second, yards/second, or the like. The user may select the units in which to display the range/speed indicia 312 by, for example, pressing the mode selector 122 shown in FIG. 1 a predetermined number of times or for a predetermined length of time.

The user display 300 may also comprise a power indicator 316 and mode indicators 318. In one embodiment, the power indicator 318 is displayed when a low battery condition exists. The mode indicators 316 display the current mode of the laser rangefinder which may be selected by pressing the mode selector 122 shown in FIG. 1. For example, "RAIN" is displayed when rain mode is selected to remove the effects of rain, snow and flying insects from the range measurement, ">150" is displayed when long range mode is selected to suppress reflections from objects such as bushes and trees that are between the rangefinder and a distant target (e.g., a target greater than 150 yards away), "SPD" is displayed when speed mode is selected to measure the speed of a target, and "CONF" is displayed when configuration mode is selected to configure the rangefinder (e.g., to configure the displayed units). In one embodiment, the mode indicators 318 comprise a reflection signal strength indicator "REFL" which is displayed when a strong target reflection signal is detected. Alternatively, the reflection signal strength indicator REFL may comprise a gauge or a bar graph which indicates the relative strength of the detected target reflection signal.

Although discussed with reference to one or more embodiments visible through the user optics of the rangefinder 100, an artisan will recognize from the disclosure herein a number of alternatives for the user display 300 of FIG. 3. For example, the user display 300 may comprise an attached or detached viewable display, such as those associated with, for example, camcorders, laptops, cell phones, personal digital assistants (PDAs), other computing devices, or the like. Also, the rangefinder 100 may include communication mechanisms, such as a signal output, that communicates with one or more of the foregoing devices in a wired or wireless manner. Thus, the rangefinder 100 can be configured to transmit range data to an external device or system for further processing or display. For example, the rangefinder 100 may be configured to transmit range information to a system configured to adjust the location of targeting indicia, such as cross-hairs or the like, in a scope or other siting device based on the range information. In an alternative embodiment, the rangefinder 100 is configured to provide an audible indication of range information through, for example, a loudspeaker, headphones, or the like.

Figure 4:
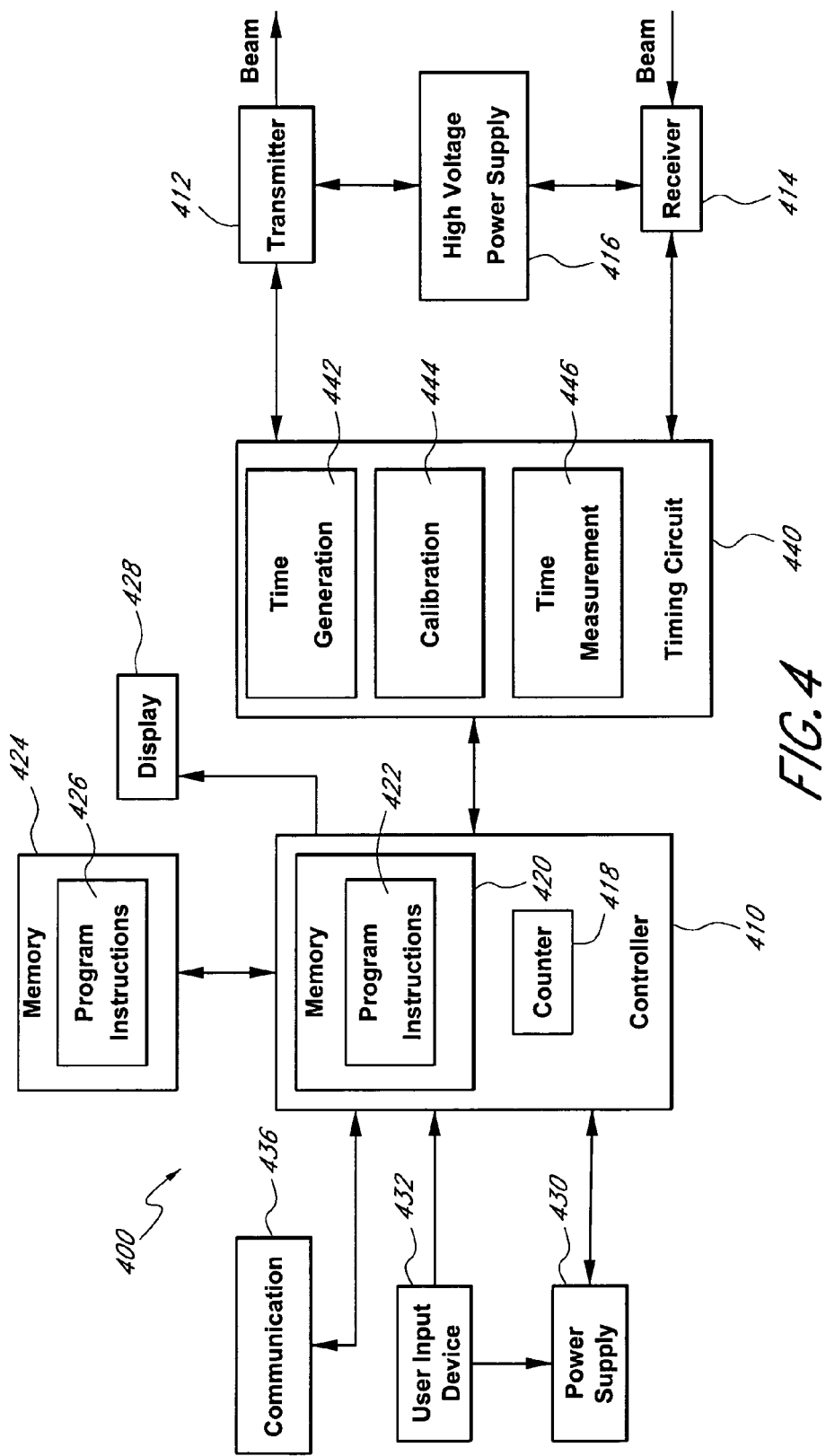
FIG. 4 is a block diagram illustrating a rangefinder system according to an embodiment of the invention.

FIG. 4 is a block diagram illustrating a rangefinder system 400 according to an embodiment of the invention. The rangefinder system 400 comprises a controller 410 coupled to a transmitter 412 and a receiver 414 through timing circuitry 440. The transmitter 412 is configured to emit a laser beam and the receiver 414 is configured to detect a reflection of the emitted laser beam. In an embodiment, the transmitter 412 and the receiver 414 can be coupled to a high voltage power supply 416.

The controller 410 comprises, by way of example, one or more processors, program logic, hardware, software, or other substrate configurations capable of representing data and instructions which operate as described herein or similar thereto. The controller 410 may also comprise controller circuitry, processor circuitry, processors, general purpose single-chip or multi-chip microprocessors, digital signal processors, embedded microprocessors, microcontrollers, combinations of the foregoing, or the like. The controller 410 further comprises a counter 418. In an alternative embodiment, the counter 418 is external to the controller 410.

In one embodiment, the controller 410 also includes an internal memory device 420 comprising, for example, random access memory (RAM). The controller can also be coupled to an external memory device 424 comprising, for example, drives that accept hard and floppy disks, tape cassettes, CD-ROM or DVD-ROM. The internal memory device 420 or the external memory device 424, or both, can comprise program instructions 422, 426 for controlling the timing circuitry 440, transmitting and receiving laser beams, storing data including range measurements and calibration data, performing statistical analysis on the measured data, and calibrating measured data as described herein.

The controller 410 is coupled to a display 428, a communication device 436, a user input device 432, and a power supply 430. In one embodiment, the display 428 is an LCD screen attached to the rangefinder system 400 configured to display a target and, for example, some or all a portion of the indicia and indicators discussed above with respect to FIG. 3. As disclosed in the foregoing, other embodiments of the display 428 include, for example, an optical viewfinder for locating a target and a separate digital display for indicating a range or speed to the target, a detachable video monitor such as a cathode ray tube (CRT), an LCD superimposed on an optical viewfinder, or the like. The communication device 436 is configured to provide communication with external systems and devices and can comprise, for example, a serial port, a parallel port, a universal serial bus (USB) controller, or an Internet or other network adapter. The user input device 432 can include, for example, a keypad, a mouse, user buttons such as the trigger actuator 120, the mode selector 122 shown in FIG. 1, or any device that allows a user to enter data into the controller 410.

According to an embodiment, the timing circuitry 440 comprises a time generation section 442, a calibration section 444 and a time measurement section 446. The time generation section 442 is configured to correlate the start of a timing parameter (not shown) with the transmission of a laser pulse by the transmitter 412. The time generation section 442 is configured to initiate the timing parameter and to command the transmitter 412 to emit a laser pulse in response to a transmit signal (not shown) received from the controller 410. The timing parameter can comprise, for example, a physical parameter stored as a function of time, such as a charge stored in a capacitor, or the like. Alternatively, the timing parameter can comprise, for example, a time value generated or stored by a counter, a timer, or the like.

The calibration section 444 is configured to remove errors in uncalibrated range measurements due to internal circuitry delays, aging, and environmental conditions such as temperature, humidity and the like. In an embodiment, the calibration section 444 is configured to simulate one or more range measurements by ignoring the reflected laser pulse and stopping the timing parameter at predetermined calibration times. The calibration section 444 corrects range measurement errors by correlating uncalibrated range measurements with the one or more simulated range measurements to create a calibrated range. In an embodiment, the calibration section 444 simulates one or more range measurements each time an uncalibrated range measurement is collected. Alternatively, the calibration section 444 simulates one or more range measurements each time a set of uncalibrated range measurements is collected.

The time measurement section 446 is configured to correlate the timing parameter with a flight time of a transmitted and reflected laser pulse. In an embodiment, the time measurement section 446 is configured to stop the timing parameter in response to a reflected laser pulse detected by the receiver 414 and to measure the timing parameter. The measured timing parameter corresponds to a flight time measurement between transmission of the laser pulse by the transmitter 412 and detection of the laser pulse by the receiver 414. In an embodiment, the time measurement section 446 is configured to stop the timing parameter at a predetermined calibration time and to measure a timing parameter corresponding to a simulated range measurement.

Figure 5:
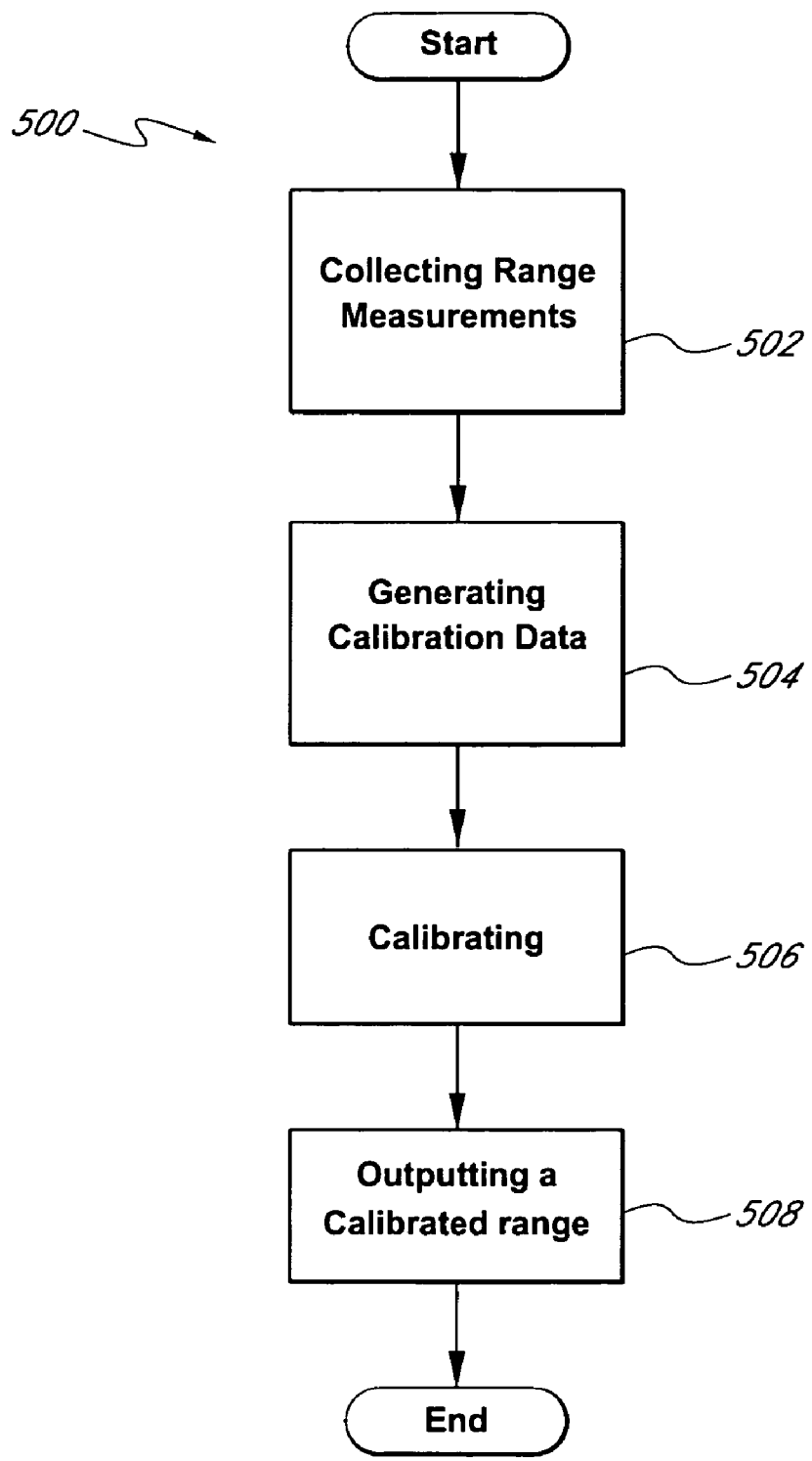
FIG. 5 is a flowchart of an exemplary data collection process usable by the rangefinder system of FIG. 4.

FIG. 5 illustrates an exemplary data collection process 500 usable by a rangefinder, such as the rangefinder system 400 of FIG. 4. The collection process 500 comprises, in short, collecting range measurements, generating calibration data, calibrating, and outputting a calibrated range. Thus, calibration data is generated each time range measurements are collected. This allows the calibration data to account for range measurement errors that vary with time or environmental conditions.

Referring to FIG. 5 at block 502, a rangefinder 400 collects range measurements. In an embodiment, range measurements are collected by measuring the flight time of transmitted and reflected energy or light beams. The measured flight time and speed of the beam is used to calculate a distance from the rangefinder 400 to a target.

At block 504, the rangefinder 400 generates calibration data. The calibration data is proportional to an error in the collected range measurements. The error may, for example, be related to dynamic factors or inherent delays in the circuitry of the rangefinder 400. In an embodiment, the calibration data is automatically generated after the rangefinder 400 collects a range measurement. Alternatively, the calibration data is automatically generated before the rangefinder 400 collects a range measurement. Preferably, the calibration data is generated within a period of time before or after the range measurement is collected so as to provide a measurement of errors related to dynamic factors, such as errors that vary with time or environmental conditions.

In an embodiment, the rangefinder 400 generates calibration data by simulating one or more range measurements. Range measurements may be simulated, for example, by measuring a predetermined calibration time and comparing the measured flight time with the predetermined calibration time to determine an error. In an embodiment, two or more range measurements are simulated to determine an error relationship between flight times and target ranges.

At block 506, the rangefinder 400 calibrates the collected range measurements by correcting for the error proportional to the calibration data. At block 508, the rangefinder 400 outputs the calibrated range. The calibrated range may be output, for example, by communicating the calibrated range value to a display device, an external memory device, a communication device, or the like.

Figure 6:
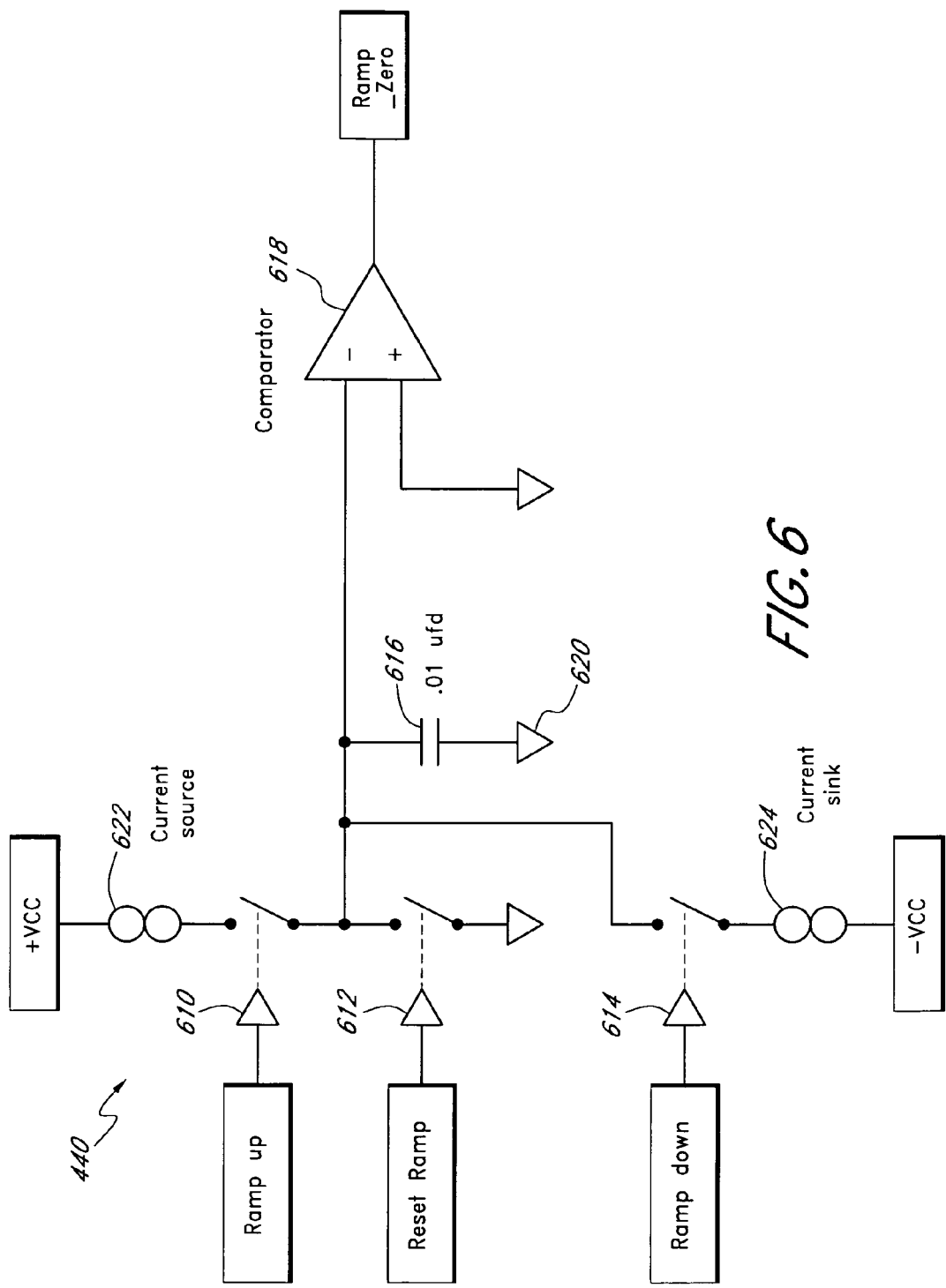
FIG. 6 is a simplified schematic of an exemplary timing circuit according to an embodiment of the invention.

FIG. 6 is a simplified schematic of an exemplary timing circuit 440 according to an embodiment of the invention. In the illustrated exemplary embodiment, the timing circuitry 440 comprises three switches 610, 612, 614 coupled to a capacitor 616 at an input of a comparator 618. The capacitor 616 is coupled between the "−" input terminal of the comparator 618 and circuit ground 620. The "+" input terminal of the comparator 618 is coupled to circuit ground 620.

Switch 610 is configured to switch the capacitor 616 to a charging signal +VCC through a current source 622 in response to a "Ramp Up" signal. Switch 612 is configured to switch the capacitor 616 to circuit ground 620 in response to a "Reset Ramp" signal. Switch 614 is configured to switch the capacitor 616 to a discharging signal −VCC through a current sink 624 in response to a "Ramp Down" signal.

The exemplary timing circuitry 440 operates in a time generation and measurement mode. In an embodiment, the time generation and measurement mode is initialized by setting a counter, such as counter 418 shown in FIG. 4, to zero and discharging the capacitor 616 by opening switches 610 and 614 and closing switch 612. Time generation is started by opening switch 612, commanding a transmitter, such as the transmitter 412 shown in FIG. 4, to emit a laser pulse and closing switch 610. With switch 610 closed, the current source 622 begins to charge the capacitor 616. In an exemplary embodiment, the capacitor 616 is a 0.01 µF capacitor and the current source 622 is a 5 mA current source. Thus, as a function of time, the charge on the capacitor 616 linearly increases or "ramps up" at +0.5 volts per microsecond, which is approximately 0.001 volts per foot of target range.

Upon detection of a reflected laser pulse, switch 610 is opened to stop charging the capacitor 616. The flight time is measured by closing switch 614 and starting the counter 418. With switch 614 closed, the current sink 624 begins to discharge the capacitor 616 while the counter 418 accumulates counts. In an exemplary embodiment, the capacitor 616 is a 0.01 µF capacitor, the current sink 624 is a 2.5 µA current sink, and the counter 418 is a sixteen bit counter that accumulates counts from a 500 kHz time base (not shown). Thus, as a function of time, the charge on the capacitor 616 linearly decreases or "ramps down" at −0.25 volts per millisecond, which is approximately two counts per foot of target range.

When the charge on the discharging capacitor 616 is equal to or less than circuit ground 620, the comparator 618 provides a "Ramp_Zero" signal. In response to the Ramp_Zero signal, switch 614 is opened and the counter 418 is stopped from accumulating any more counts. The value in the counter 418 comprises an uncalibrated flight time measurement. The uncalibrated flight time measurement is converted into an uncalibrated range measurement using, for example, the method discussed above in relation to equation (1). At least one of the uncalibrated flight time measurement and uncalibrated range measurement is stored. In an embodiment, a plurality of uncalibrated range measurements are generated before performing analysis on the plurality of uncalibrated range measurements, such as calibrating the uncalibrated range measurements.

Figure 7A:
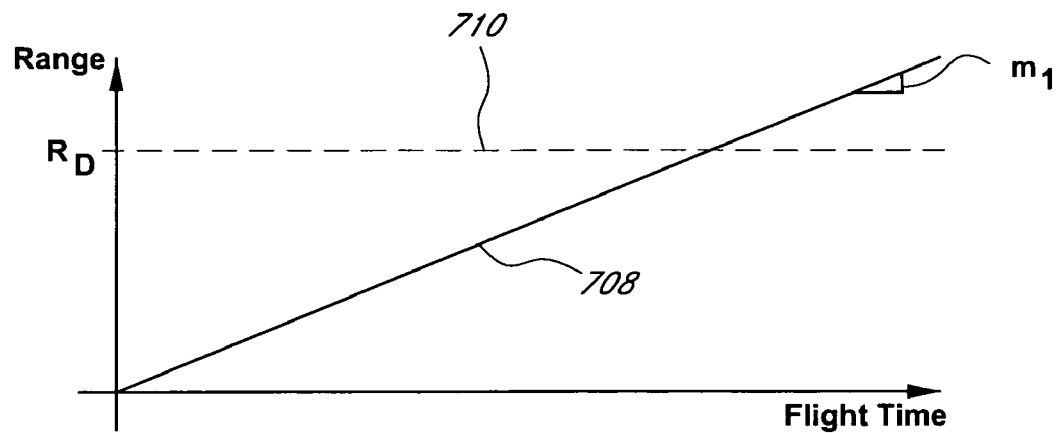
FIGS. 7A and 7B are exemplary graphical representations illustrating a target range versus a flight time of a laser beam.
Figure 7B:
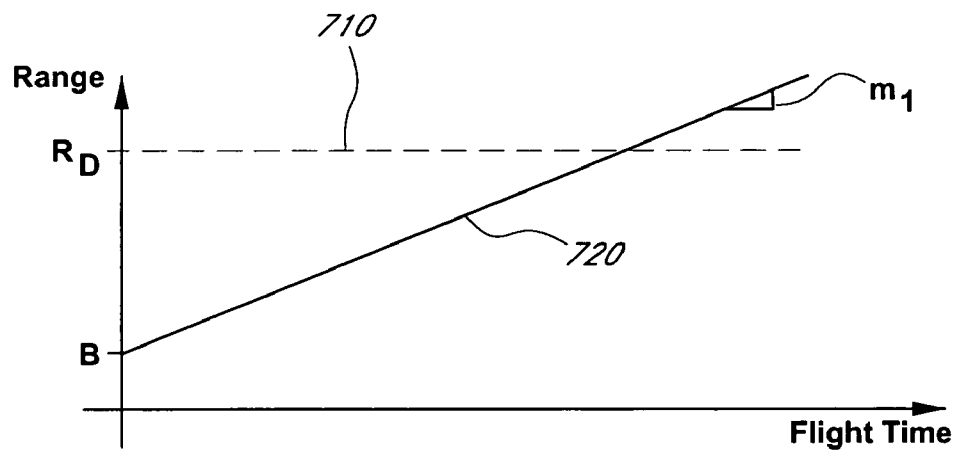

FIGS. 7A and 7B are exemplary graphical representations illustrating a target range versus a flight time of a laser beam. Referring to FIG. 7A, line 708 has a slope $m_1$ and illustrates a linear relationship between an actual range and an actual flight time. Thus, line 708 represents a situation in which a rangefinder system has no errors in measuring a flight time. The slope $m_1$ is dependent upon the speed of the laser pulse. In the example discussed in relation to equation (1) above, the range to a target equals about 0.49178 feet per nanosecond multiplied by the flight time in nanoseconds. Thus, for that example, the slope $m_1$ equals 0.49178 feet per nanosecond.

The dashed line 710 corresponds to an uncalibrated range measurement $R_D$. If there were no errors in the rangefinder system, the actual flight time would correspond to the intersection of line 708 and the dashed line 710. However, in the presence of timing errors, the relationship between the uncalibrated range measurement $R_D$ and line 708 is unknown because the actual flight time corresponding to the uncalibrated range measurement $R_D$ is uncertain.

Referring to FIG. 7B, line 720 illustrates a linear relationship between a range to a target and a flight time in the presence of errors caused by inherent delays in internal rangefinder electronics. For example, a transmitter and a receiver contribute a small amount of delay to the round trip flight time measurement. Further, the rise time of the receiver output signal is a function of the strength of the reflected laser pulse signal at the receiver. To calibrate for these propagation delays, line 720 is shifted by a range calibration value B while maintaining the same slope $m_1$ as line 708 in FIG. 7A.

In one embodiment, the range calibration value B equals a first memory constant B1 (not shown) when the reflected laser pulse signal at the receiver is relatively strong compared to a maximum receiver signal. Similarly, the range calibration value B equals a second memory constant B2 (not shown) when the reflected laser pulse signal at the receiver is relatively weak compared to the maximum receiver signal.

In one embodiment, the first memory constant B1 and the second memory constant B2 are generated during factory calibration and alignment of the rangefinder and are stored, for example, in electronically accessible medium, such as a nonvolatile memory within the rangefinder. For example, the user input device 432 or the communication device 436 shown in FIG. 4 may be used to store the first memory constant B1 and the second memory constant B2 in the memory device 420 of the rangefinder system 400.

In one embodiment, the range calibration value B is selected from a range of values based upon the received signal strength. In an exemplary embodiment, the range of values includes a linear relationship between the first memory constant B1 and the second memory constant B2 proportional to the received signal strength. Thus, the range calibration value B is selected as a function of the received signal strength.

The dashed line 710 in FIG. 7B again corresponds to an uncalibrated range measurement $R_D$. If propagation delays corresponding to the range calibration value B were the only errors in the timing measurement, the actual flight time would correspond to the intersection of line 720 and the dashed line 710. However, in the presence of timing errors that vary with time or environmental conditions, the relationship between the uncalibrated range measurement $R_D$ and line 720 is unknown because the actual flight time corresponding to the uncalibrated range measurement $R_D$ is uncertain.

Figure 8A:
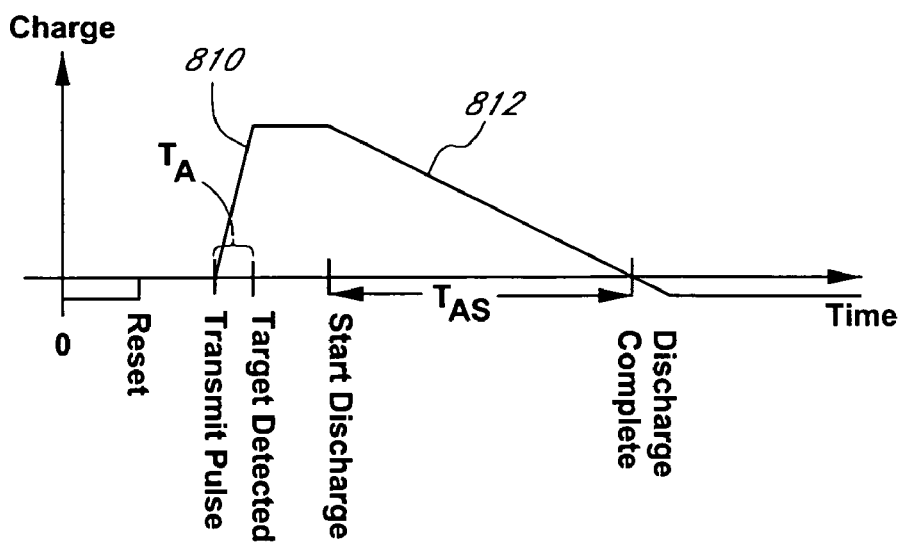
FIGS. 8A and 8B are exemplary graphical representations illustrating charge in a capacitor during first and second calibration measurements.
Figure 8B:
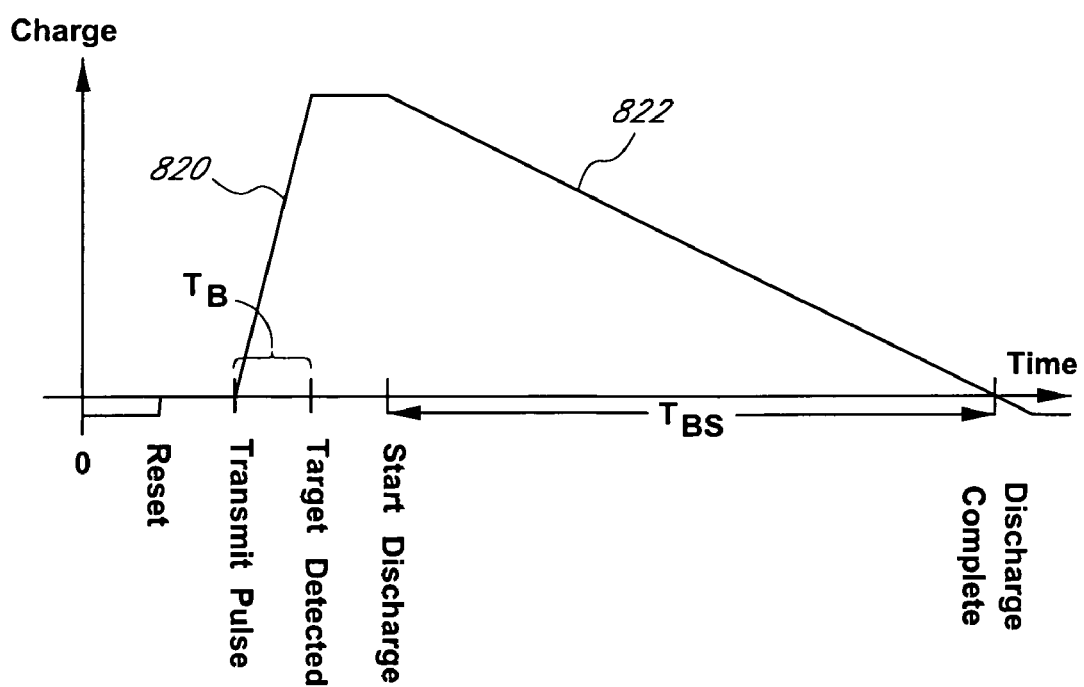

FIGS. 8A and 8B are exemplary graphical representations illustrating charge in a capacitor during first and second calibration measurements. Referring to FIGS. 6, 8A and 8B, the timing circuitry 440 operates in a calibration mode. In an embodiment, two calibration measurements are performed. FIG. 8A illustrates the charge on the capacitor 616 as a function of time during a first calibration measurement and FIG. 8B illustrates the charge on the capacitor 616 as a function of time during a second calibration measurement. The first calibration measurement is initialized or "Reset" by disabling the receiver and removing any charge in the capacitor 616 by opening switches 610 and 614 and closing switch 612. Calibration time generation is started by opening switch 612, transmitting a laser pulse and closing switch 610. With switch 610 closed, the current source 622 begins to charge the capacitor 616 as indicated by line 810 in FIG. 8A.

At a predetermined first calibration time $T_A$ after transmitting the laser pulse, switch 610 is opened to stop the charging of the capacitor 616. The charge in the capacitor 616 is held until a first simulated flight time $T_{AS}$ measurement is determined by measuring the time required to discharge the capacitor 616. Switch 614 is closed to start discharging the capacitor 616 through the current sink 624 as indicated by line 812. When the charge on the discharging capacitor 616 is equal to or less than circuit ground 620, the discharge is complete and the comparator 618 provides a Ramp_Zero signal. In response to the Ramp_Zero signal, switch 614 is opened and the first simulated flight time $T_{AS}$ measurement is recorded. As discussed above with respect to equation (1), the first simulated flight time $T_{AS}$ can be converted to a first simulated range $R_A$ (not shown).

The second calibration measurement is initialized or "Reset" by disabling the receiver and removing any charge on the capacitor 616 by opening switches 610 and 614 and closing switch 612. Calibration time generation is started by opening switch 612, transmitting a laser pulse and closing switch 610. With switch 610 closed, the current source 622 begins to charge the capacitor 616 as indicated by line 820 in FIG. 8B.

At a predetermined second calibration time $T_B$ after transmitting the laser pulse, switch 610 is opened to stop the charging of the capacitor 616. The charge in the capacitor 616 is held until a second simulated flight time $T_{BS}$ measurement is determined by measuring the time required to discharge the capacitor 616. Switch 614 is closed to start discharging the capacitor 616 through the current sink 624 as indicated by line 822. When the charge on the discharging capacitor 616 is equal to or less than circuit ground 620, the discharge is complete and the comparator 618 provides a Ramp_Zero signal. In response to the Ramp_Zero signal, switch 614 is opened and the second simulated flight time $T_{BS}$ measurement is recorded. As discussed above with respect to equation (1), the second simulated flight time $T_{BS}$ can be converted to a second simulated range $R_B$ (not shown).

Figure 9A:
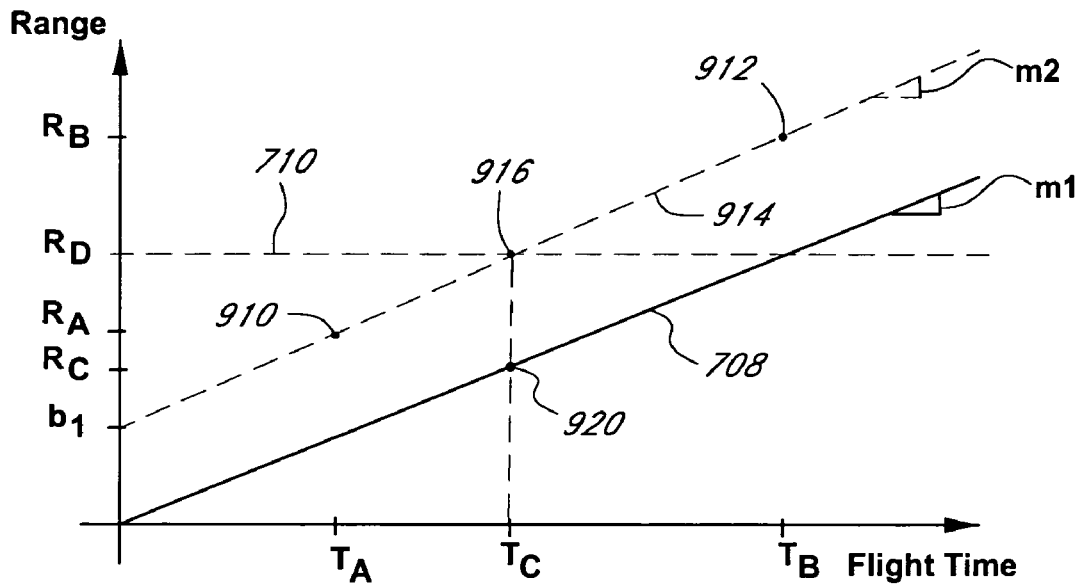
FIGS. 9A and 9B are exemplary graphical representations illustrating a target range versus a flight time of a laser beam, an uncalibrated range measurement, a first simulated range measurement, and a second simulated range measurement.
Figure 9B:
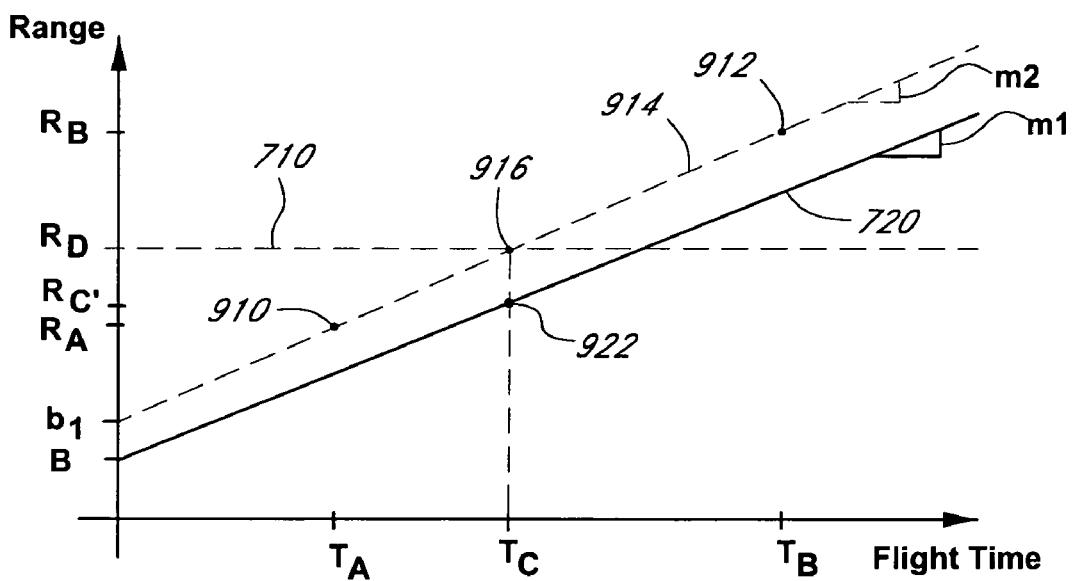

FIGS. 9A and 9B are exemplary graphical representations illustrating a target range versus a flight time of a laser beam, an uncalibrated range measurement, a first simulated range measurement, and a second simulated range measurement. FIG. 9A illustrates line 708 and line 710 of FIG. 7A with slope $m_1$ and representing the linear relationship between an actual range and an actual flight time, and the uncalibrated range measurement $R_D$, respectively. FIG. 9A also illustrates a first calibration point 910 and a second calibration point 912 defining a calibration line 914 having the form of a linear equation:

$$y = mx + b \qquad (2),$$

where y corresponds to the Range axis, m is the slope $m_2$ of the calibration line 914, x corresponds to the Flight Time axis, and b corresponds to the interception of the calibration line 914 with the Range axis at $b_1$.

The first calibration point 910 corresponds to the first simulated range $R_A$ and the predetermined first calibration time $T_A$. The second calibration point 912 corresponds to the second simulated range $R_B$ and the predetermined second calibration time $T_B$. Thus, the slope $m_2$ of line 914 is defined by:

$$m_2 = (R_B - R_A)/(T_B - T_A) \qquad (3).$$

Having defined the calibration line 914, uncalibrated data point 916 corresponding to uncalibrated range measurement $R_D$ is defined by the interception of line 710 and calibration line 914. The interception of line 710 and calibration line 914 is found by solving equation (2) for x corresponding to a calibrated flight time $T_C$. Thus, the calibrated flight time $T_C$ is given by:

$$T_C = (R_D - b_1)/m_2 \quad (4).$$

Once the calibrated flight time $T_C$ is known, the uncalibrated data point 916 is correlated to a calibrated data point 920 along line 708 at the calibrated flight time $T_C$. The calibrated data point 920 corresponds to a calibrated range $R_C$ which is determined by solving equation (2) where y is the calibrated range $R_C$, m is slope $m_1$, x is the calibrated flight time $T_C$ defined by equation (4), and b is zero. Thus, the calibrated range $R_C$ is given by:

$$R_C = m_1(T_C) + 0 = m_1(R_D - b_1)/m_2 \quad (5).$$

In the example discussed in relation to equation (1) above, the range to a target equals 0.49178 feet per nanosecond multiplied by the flight time in nanoseconds. Thus, for that example, the slope $m_1$ equals 0.49178 feet per nanosecond. Substituting this value for $m_1$ and equation (3) for $m_2$ in equation (5) gives:

$$R_C = (R_D - b_1)(0.49178/m_2) = (R_D - b_1)(0.49178/(R_B - R_A))(T_B - T_A) \quad (6).$$

FIG. 9B illustrates line 720 and line 710 of FIG. 7B in relation to the first calibration point 910 and the second calibration point 912 shown in FIG. 9A. As discussed above, line 720 illustrates a linear relationship between a range to a target and a flight time in the presence of errors caused by delays in internal rangefinder electronics. Line 720 is shifted by a range calibration value B while maintaining slope $m_1$. The calibration line 914, slope $m_2$, uncalibrated data point 916, and calibrated flight time are each determined as described above.

In FIG. 9B, the uncalibrated data point 916 is correlated to a calibrated data point 922 along line 720 at the calibrated flight time $T_C$. The calibrated data point 922 corresponds to a calibrated range $R_C'$ which is determined by solving equation (2) where y is the calibrated range $R_C'$, m is slope $m_1$, x is the calibrated flight time $T_C$ defined by equation (4), and b is B. Thus, the calibrated range $R_C'$ is given by:

$$R_C' = (m_1(T_C)) + B = (m_1(R_D - b_1)/m_2) + B \quad (7).$$

In the example discussed in relation to equation (1) above, the slope $m_1$ equals 0.49178 feet per nanosecond. Substituting this value for m1 and equation (3) for $m_2$ in equation (7) gives:

$$R_C' = ((R_D - b_1)(0.49178/(R_B - R_A))(T_B - T_A)) + B \quad (8).$$

Therefore, by generating at least two simulated calibration measurements for each range measurement or group of range measurements, time-varying range measurement errors can be corrected by using equation (6). Further, time-varying range measurement errors and errors due to a transmitter, receiver and receiver signal strength can be corrected by using equation (8).

Although the present invention has been described with reference to specific embodiments, other embodiments will occur to those skilled in the art. For example, timing circuitry, such as the timing circuitry 440 shown in FIG. 4, may comprise a high speed counter (not shown) driven by a time base (not shown) such as an oscillator. In an embodiment, the high speed counter is configured to accumulate counts from the time base when a beam is emitted and to stop accumulating counts from the time base when a beam is detected. Thus, the flight time of an emitted and reflected beam is proportional to the counts accumulated by the high speed counter. In such an embodiment, calibration is provided by accounting for inherent delays in internal rangefinder electronics such as discrete component delays in the transmitter and receiver as well as delays caused by the rise time of the receiver output signal as a function of the strength of the received signal.

For example, taking the distance traveled by the transmitted and reflected beams at an exemplary speed to be about 6.1002 nanoseconds per yard and the high speed counter to accumulate counts at an exemplary count of about 6.25 nanoseconds per count, the range to the target may be calculated as:

$$\text{Range (yards)} = (((6.25/6.1002) \times \text{raw range count}) + B) \quad (9),$$

where 6.25 nanoseconds per count and 6.1002 nanoseconds per yard are provided for exemplary reasons only and are not intended to limit or construe the disclosure or claims. The "raw range count" is the count accumulated by the high speed counter while measuring the flight time of the transmitted and reflected beams.

The "B" term in equation (9) represents a range calibration value. In an embodiment, the range calibration value B equals a first memory constant when the reflected beam signal is relatively strong compared to a maximum receiver signal. Similarly, the range calibration value B equals a second memory constant when the reflected beam signal is relatively weak compared to the maximum receiver signal. In an embodiment, the range calibration value B is selected from a range of values between the first memory constant and the second memory constant so as to be proportional to the strength of the reflected beam signal. In an embodiment, the first memory constant and the second memory constant are generated during factory calibration and alignment of the rangefinder and are stored, for example, in electronically accessible medium, such as a nonvolatile memory within the rangefinder.

It is to be understood that the embodiments described above have been presented by way of example, and not limitation, and that the invention is defined by the appended claims.

What is claimed is:

1. A method for calibrating a rangefinder having a transmitter for emitting a beam towards a target and a receiver for detecting a reflected beam, wherein an uncalibrated flight time of the beam and the reflected beam is measured by a counter, the method comprising:
   determining a first relationship between flight times and target ranges, wherein the first relationship has a corresponding first slope;
   generating a first simulated range measurement by measuring a first discharge time of a capacitor;
   generating a second simulated range measurement by measuring a second discharge time of the capacitor;
   calculating a second relationship between flight times and target ranges based on the first and second simulated range measurements, wherein the second relationship has a corresponding second slope;
   using the second relationship to correlate an uncalibrated range measurement to the first relationship; and
   determining a distance to a target.

2. The method of claim 1, further comprising calculating the first slope as proportional to the speed of the beam.

3. The method of claim 1, wherein generating the first simulated range measurement comprises charging the capacitor for a first calibration time.

4. The method of claim 3, wherein generating the second simulated range measurement comprises charging the capacitor for a second calibration time.

5. The method of claim 4, further comprising basing the second relationship on the first and second calibration times.

6. The method of claim 4, further comprising calculating the second slope as proportional to the ratio of the difference between the first and second simulated range measurements and the difference between the first and second calibration times.

7. The method of claim 1, wherein generating the first simulated range measurement comprises calculating the first simulated range measurement as proportional to the first discharge time multiplied by the speed of the beam.

8. The method of claim 1, wherein generating the second simulated range measurement comprises calculating the second simulated range measurement as proportional to the second discharge time multiplied by the speed of the beam.

9. The method of claim 1, wherein correlating the uncalibrated range measurement to the first relationship comprises:
    calculating a calibrated flight time by correlating the uncalibrated range measurement to the second relationship; and
    correlating the calibrated flight time to the first relationship to determine a calibrated range.

10. The method of claim 1, further comprising shifting the first relationship by a selected range calibration value.

11. The method of claim 10, further comprising selecting the range calibration value according to the strength of a detected beam.

12. A rangefinder configured to determine a calibrated range to a target, the rangefinder comprising:
    a transmitter configured to emit a beam towards the target;
    a receiver configured to detect a reflected beam from the target;
    timing circuitry configured to measure a flight time between the emission of the beam from the transmitter and a detection of the reflected beam by the receiver;
    a calibration section configured to determine calibration data related to dynamic factors; and
    a processor configured to adjust the flight time based on the calibration data.

13. The rangefinder of claim 12, wherein the transmitter comprises a laser diode configured to emit a pulsed laser beam.

14. The rangefinder of claim 12, wherein the calibration section is further configured to simulate first and second range measurements.

15. The rangefinder of claim 14, wherein the processor is further configured to correlate, the measured flight time to the first and second simulated range measurements.

16. The rangefinder of claim 12, wherein the dynamic factors comprise range measurement errors that vary with environmental conditions.

17. The rangefinder of claim 12, wherein the processor is further configured to adjust the flight time based on inherent delays of the rangefinder.

18. The rangefinder of claim 12, wherein the timing circuitry comprises a capacitor configured to charge at a first rate when the transmitter emits the beam and to discharge at a second rate in response to the reflected beam detected by the receiver.

19. The rangefinder of claim 18, further comprising a comparator coupled to the capacitor, the comparator configured to indicate when the capacitor is discharged.

20. The rangefinder of claim 18, further comprising a counter configured to measure a discharge time of the capacitor.

21. The rangefinder of claim 18, wherein the calibration section is further configured to:
    disable the receiver;
    charge the capacitor at the first rate for a first calibration time;
    discharge the capacitor at the second rate to obtain a first discharge time;
    charge the capacitor at the first rate for a second calibration time; and
    discharge the capacitor at the second rate to obtain a second discharge time.

22. The rangefinder of claim 18, wherein the processor is further configured to correlate the measured flight time to a relationship between a plurality of flight times and a plurality of target ranges based on the speed of the beam.

23. A system for measuring a range to a target, the system comprising:
    a means for storing a first parameter proportional to a flight time of a beam and for storing second and third parameters proportional to respective first and second calibration times;
    a means for measuring the stored first, second and third parameters to respectively produce an uncalibrated range measurement and first and second simulated range measurements; and
    a means for correlating the uncalibrated range measurement to the first and second simulated range measurements.

24. The system of claim 23, further comprising a means for correlating the uncalibrated flight time to a relationship between a plurality of flight times and plurality of target ranges based on the speed of the beam.

25. A method for measuring a range to a target, the method comprising:
    measuring at least a first time corresponding to a beam traveling between a range finder and the target;
    collecting calibration data by simulating a second time and a third time corresponding to the beam traveling between the range finder and the target;
    correlating the at least a first time to the second time and the third time; and
    outputting a range.

26. The method of claim 25, wherein collecting calibration data comprises:
    disabling a rangefinder receiver;
    emitting a laser beam;
    charging a capacitor at a first rate for a period of time selected from the group comprising the second time and the third time;
    measuring the discharge time of the capacitor at a second rate; and
    calculating a simulated range measurement proportional to the discharge time.

* * * * *

UNITED STATES PATENT AND TRADEMARK OFFICE
CERTIFICATE OF CORRECTION

PATENT NO.          : 7,053,992 B2                                        Page 1 of 1
APPLICATION NO. : 10/793144
DATED                  : May 30, 2006
INVENTOR(S)        : LaBelle et al.

It is certified that error appears in the above-identified patent and that said Letters Patent is hereby corrected as shown below:

Title page, column 1 (Inventors), item 75 line 2, delete "Cheo Hills," and insert -- Chino Hills, --, therefore.

Page 2, column 2 (Other Publications), line 10, after "Inc." insert -- , --.

Sheet 8 of 8, Fig. 9A, delete "m2" and insert -- $m_2$ --, therefore.

Sheet 8 of 8, Fig. 9A, delete "m1" and insert -- $m_1$ --, therefore.

Sheet 8 of 8, Fig. 9B, delete "m2" and insert -- $m_2$ --, therefore.

Sheet 8 of 8, Fig. 9B, delete "m1" and insert -- $m_1$ --, therefore.

Column 3, line 2, delete "EMBODIMENT" and insert -- EMBODIMENTS --, therefore.

Column 11, line 45, delete "m1" and insert -- $m_1$ --, therefore.

Column 13, line 51, in claim 15, after "correlate" delete ",".

Signed and Sealed this

Tenth Day of July, 2007

JON W. DUDAS
*Director of the United States Patent and Trademark Office*